No. 620,124. Patented Feb. 28, 1899.
F. HASSIS.
FAUCET.
(Application filed Aug. 3, 1898.)

(No Model.)

WITNESSES
Geo. M. Rupert
Alfred Rupert

INVENTOR
Felix Hassis
by Chas. H. Pennypacker
his Attorney.

THE NORRIS PETERS CO., PHOTO-LITHO., WASHINGTON, D. C.

UNITED STATES PATENT OFFICE.

FELIX HASSIS, OF PHILADELPHIA, PENNSYLVANIA.

FAUCET.

SPECIFICATION forming part of Letters Patent No. 620,124, dated February 28, 1899.

Application filed August 3, 1898. Serial No. 687,660. (No model.)

*To all whom it may concern:*

Be it known that I, FELIX HASSIS, a citizen of the United States, residing at Philadelphia, in the county of Philadelphia and State of Pennsylvania, have invented certain new and useful Improvements in Faucets; and I do hereby declare the following to be a full, clear, and exact description of the invention, such as will enable others skilled in the art to which it appertains to make and use the same.

My invention relates to improvements in faucets; and its object is to provide faucets which will be capable of controlling the flow of liquids of different temperatures or different consistencies or liquids of different kinds, either separately or mixed, in desired proportions.

It consists in certain novel constructions, combinations, and arrangements of parts, as will be fully described and claimed.

Figure 1:
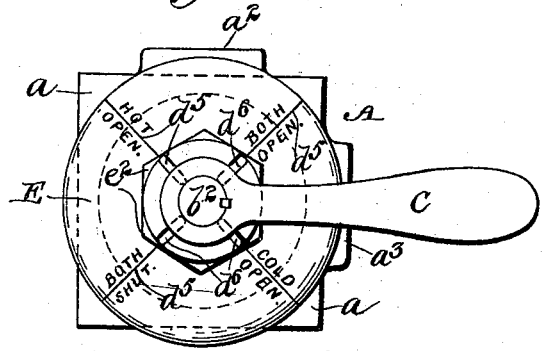
Figure 2:
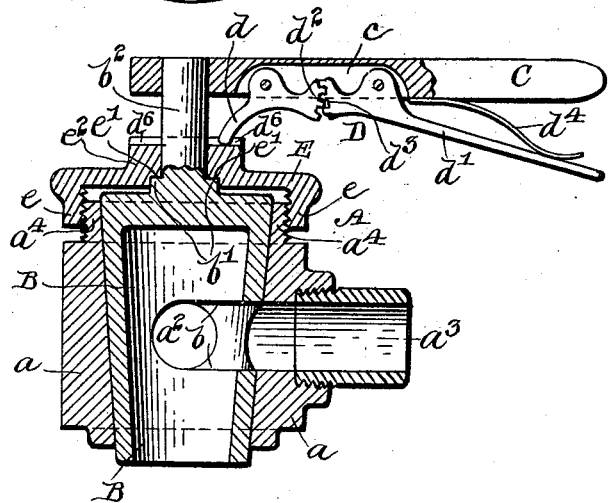

In the accompanying drawings, Figure 1 is a top plan view of a faucet constructed in accordance with my invention. Fig. 2 is a central vertical section through the same, and Fig. 3 is a horizontal section thereof.

A in the drawings represents a faucet; B, a spigot or valve therefor, and C represents a handle or cock for operating the valve.

The body portion $a$ of the faucet A is preferably made rectangular in shape and is provided with a central opening or socket, as at $a'$, to receive the spigot or valve B. Communicating with the socket $a'$ are inlet-ports, as $a^2$ $a^3$, preferably formed in the body portion $a$ at an angle of about forty-five degrees with respect to each other, as clearly seen in Fig. 3 of the drawings. The said inlet-ports may be provided with screw-threads to engage corresponding threads upon piping leading to the same.

Figure 3:
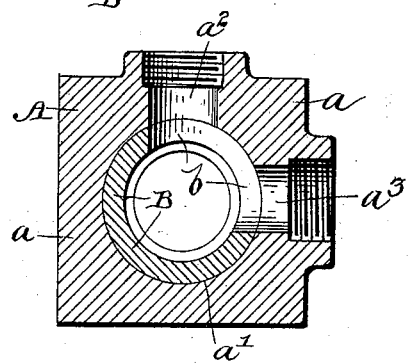

The spigot or valve B is preferably conical in shape and is made hollow, as seen in Fig. 3. The valve B fits snugly into the socket $a'$ and is held in place by means of the cap E. In one side of the valve B an elongated slot forming a port, as $b$, is formed, the said port $b$ being made of sufficient length to extend from the inlet-port $a^2$ to the inlet-port $a^3$, as illustrated in Fig. 3, so that when the valve B is in the position shown in the said figure both inlet-ports will be open to the interior of the said valve. It will be apparent that by turning the valve, say, forty-five degrees one or the other of the inlets may be closed, the other one being still open. So, also, by turning the valve one hundred and eighty degrees or half-way around both ports may be closed to prevent any escape of liquid from the pipes.

In order to hold the valve B snugly in its seat, the cap E is provided with an overhanging flange $e$, having interiorly-arranged screw-threads which engage corresponding threads formed upon an annular projection $a^4$, formed upon the body portion $a$ of the faucet A.

The cap E is preferably formed with an annular depression or seat, as $e'$, which engages and exerts a pressure upon an annular shoulder, as $b'$, formed upon the top of the valve B to hold the same in place. The valve may or may not be packed, as desired. The cap E is formed with a nut portion $e^2$, surrounding the valve-stem, by which the said cap can be turned to screw it in place or to remove it.

The valve B is provided with a stem $b^2$, which extends through the cap E and receives upon its upper end the handle C. The handle C may be made in any well-known form and is keyed or otherwise rigidly secured to the stem $b^2$ of the valve.

In order that it may be known exactly in what position the valve stands and how far to move it to regulate the flow of liquid through the faucet, I contemplate mounting an indicator upon the handle C, as at D. The indicator D comprises a pointer-lever $d$ and an operating handle or lever $d'$, both of which are pivotally mounted in a recess, as $c$, formed in the under side of the handle C, the said levers $d$ and $d'$ being provided with pivoting lugs or projections for this purpose. Each of the levers $d$ and $d'$ is provided with segmental racks, as $d^2$ $d^3$, which mesh with each other, as illustrated in Fig. 3. The free end of the pointer $d$ rests normally upon the cap E because of the action of the spring $d^4$, which is interposed between the handle C and the indicator-handle $d'$. Coöperating with the pointer $d$ are suitable marks of indication, as at $d^5$, Fig. 1. The marks may have words near them—as, for instance, "Hot open," "Both open," "Cold open," "Both shut"—when the faucet is used for hot and cold water. Recesses or sockets, as $d^6$, may also be formed, if desired, in the top of the cap to receive the end of the pointer $d$ for locking or holding the handle and the valve in each of their adjusted positions.

It will be readily seen from the above description that when it is desired to regulate the flow of liquid from the faucet it is only necessary to take hold of the handle C, at the same time putting sufficient pressure upon the indicator-handle $d'$ to raise the pointer $d$, when the handle and valve may be turned to a new position. By bringing the pointer opposite to the mark upon the cap indicating the desired position the spigot or valve will be turned the amount required to accomplish the desired result.

While, as I have intimated, my improved faucet is adapted to control the flow of different kinds of liquids, yet it is particularly well adapted for use with hot and cold water, it being possible by its use to draw either hot or cold water separately or in a mixed condition, all by the simple movement of the handle or cock and its spigot.

My improved faucet is also extremely simple in construction and not likely to get out of order.

Having now described my invention, what I desire to claim and secure by Letters Patent is—

1. A faucet comprising a body portion having inlet-ports a spigot for controlling the same, a handle for operating the said spigot and an indicator pivotally mounted on said handle for showing the position of the spigot, and means for raising or lowering it to change the cock, substantially as described.

2. A faucet comprising a body portion having inlet-ports a spigot or valve for controlling the same, a cock or handle on said spigot, and an indicator upon said handle comprising a pointer and an operating-handle pivoted to the handle, and means for operatively connecting these parts whereby one communicates movement to the other, substantially as described.

3. A faucet comprising a body portion having inlet-ports a spigot or valve for controlling the same, a cap for holding the spigot to its seat, a handle for operating said spigot, an indicator upon the handle comprising a pointer-lever and an operating handle or lever pivotally mounted in a recess upon the under side of the handle, the said pointer being adapted to be brought opposite indication-marks upon the top of the cap to show the position of the spigot and racks formed upon each of the levers and meshing with each other to communicate the movement from one to the other substantially as described.

4. A faucet comprising a body portion having inlet-ports a spigot for controlling the same, a cap for holding the spigot in place and having indicating notches or recesses formed in it, an indicator mounted upon the spigot-handle and adapted to engage the said recesses for indicating the position of the spigot and holding it in said position, substantially as described.

In testimony whereof I hereunto affix my signature in presence of two witnesses.

FELIX HASSIS.

Witnesses:
JENNIE P. HOFFMAN,
JOHN A. RUPERT.